United States Patent
Bamba et al.

(10) Patent No.: US 12,271,619 B2
(45) Date of Patent: Apr. 8, 2025

(54) INFORMATION PROCESSING DEVICE AND APPLICATION EXECUTION METHOD FOR MANAGING AN APPLICATION EXECUTION ENVIRONMENT

(71) Applicant: SONY INTERACTIVE ENTERTAINMENT INC., Tokyo (JP)

(72) Inventors: Syunsuke Bamba, Tokyo (JP); Makoto Sunayama, Tokyo (JP); Masaki Takahashi, Tokyo (JP); Keiichi Aoki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 212 days.

(21) Appl. No.: 17/612,107

(22) PCT Filed: May 29, 2020

(86) PCT No.: PCT/JP2020/021313
§ 371 (c)(1),
(2) Date: Nov. 17, 2021

(87) PCT Pub. No.: WO2020/246378
PCT Pub. Date: Dec. 10, 2020

(65) Prior Publication Data
US 2022/0253235 A1  Aug. 11, 2022

(30) Foreign Application Priority Data
Jun. 6, 2019  (JP) .................................. 2019-106243

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 8,943,019 B1 * | 1/2015 | Patwardhan | G06F 16/119 |
| | | | 707/610 |
| 10,754,568 B1 * | 8/2020 | Long | G06F 3/0605 |
| 2007/0255759 A1 * | 11/2007 | Akelbein | G06F 16/122 |
| 2011/0302137 A1 * | 12/2011 | Dawkins | G06F 16/1727 |
| | | | 707/640 |

(Continued)

FOREIGN PATENT DOCUMENTS

| | | |
|---|---|---|
| JP | 2017213192 A | 12/2017 |
| WO | 2014111985 A1 | 7/2014 |

OTHER PUBLICATIONS

International Search Report and Written Opinion mailed Aug. 18, 2020, from PCT/JP2020/021313, 9 sheets.

*Primary Examiner* — Eric T Loonan
(74) *Attorney, Agent, or Firm* — XSENSUS LLP

(57) ABSTRACT

A reading-out section 108 is capable of reading out files recorded in a first auxiliary storage device 2a and a second auxiliary storage device 2b. A recording management section 106 moves a file of an application recorded in the second auxiliary storage device 2b to the first auxiliary storage device 2a. An application execution section 102 executes the application by using the file moved to the first auxiliary storage device 2a.

4 Claims, 9 Drawing Sheets

(56) References Cited

U.S. PATENT DOCUMENTS

| | | | |
|---|---|---|---|
| 2015/0126288 A1* | 5/2015 | Okino | G11B 20/10527 463/43 |
| 2015/0208205 A1* | 7/2015 | Chan | H04L 67/1095 709/224 |
| 2015/0373107 A1* | 12/2015 | Chan | H04L 67/1095 709/205 |
| 2016/0092141 A1* | 3/2016 | Araki | G06F 3/0643 711/165 |
| 2017/0048117 A1* | 2/2017 | Tsuchiya | G06F 3/04842 |
| 2017/0340965 A1* | 11/2017 | Tsuchiya | A63F 13/327 |
| 2022/0088494 A1* | 3/2022 | Bamba | A63F 13/63 |

* cited by examiner

INFORMATION PROCESSING DEVICE AND APPLICATION EXECUTION METHOD FOR MANAGING AN APPLICATION EXECUTION ENVIRONMENT

TECHNICAL FIELD

The present invention provides a technology related to execution of an application.

BACKGROUND ART

Conventionally, game software has been distributed and sold in the form of a ROM (Read Only Memory) medium such as an optical disk, a magneto-optical disk, or a Blu-ray disk. Together with increase in speed of data communication, it has recently become possible for a server to distribute an image file of game software through the Internet.

Game software includes a plurality of files for executing a game such as a start-up file and a game program and a plurality of files that are used by an OS (Operating System) for a game device. In recent years, the number of files included in game software has become great, and there is a tendency that the data size becomes great.

PTL 1 discloses a group structure in which game software is divided into a plurality of groups such that a program file and a data file necessary for start-up of the game software belong to one of the groups (first group). According to the technology disclosed in PTL 1, if download and installation of all files belonging to the first group are completed, then even if files of second and succeeding groups are not installed, the game software can be started up. The files belonging to the second and succeeding groups can be downloaded on the background while a user is playing the game and can be installed into an auxiliary storage device.

CITATION LIST

Patent Literature

[PTL 1]
PCT Patent Publication No. 2014/111985

SUMMARY

Technical Problem

Increased data size of game software consumes a large part of the capacity of an auxiliary storage device for recording the game software. In order to increase a storage capacity of a game device, a user connects an extended storage to the game device. However, the game device sometimes cannot guarantee operation of game software installed in the extended storage. Therefore, even where an extended storage is connected, it is necessary that an environment in which game software can be executed favorably is provided. It is to be noted that, also in regard to applications of other types, there arises a problem similar to that in the case of game software.

Therefore, it is an object of the present invention to realize an environment in which an application can be executed favorably.

Solution to Problem

In order to solve the problem described above, an information processing device according to an aspect of the present invention is capable of reading out files recorded in a first auxiliary storage device and a second auxiliary storage device. The information processing device includes a recording management section that moves a file of an application recorded in the second auxiliary storage device to the first auxiliary storage device and an application execution section that executes the application by using the file moved to the first auxiliary storage device.

Another aspect of the present invention is an application execution method executed by an information processing device that is capable of reading out files recorded in a first auxiliary storage device and a second auxiliary storage device. The application execution method includes a step of moving a file of an application recorded in the second auxiliary storage device to the first auxiliary storage device and a step of executing the application by using the file moved to the first auxiliary storage device.

It is to be noted that any combinations of the constituent elements described above and representations of the present invention obtained by conversion between a method, a device, a system, a recording medium, a computer program, and so forth are also effective as aspects of the present invention.

DESCRIPTION OF EMBODIMENTS

Figure 1:
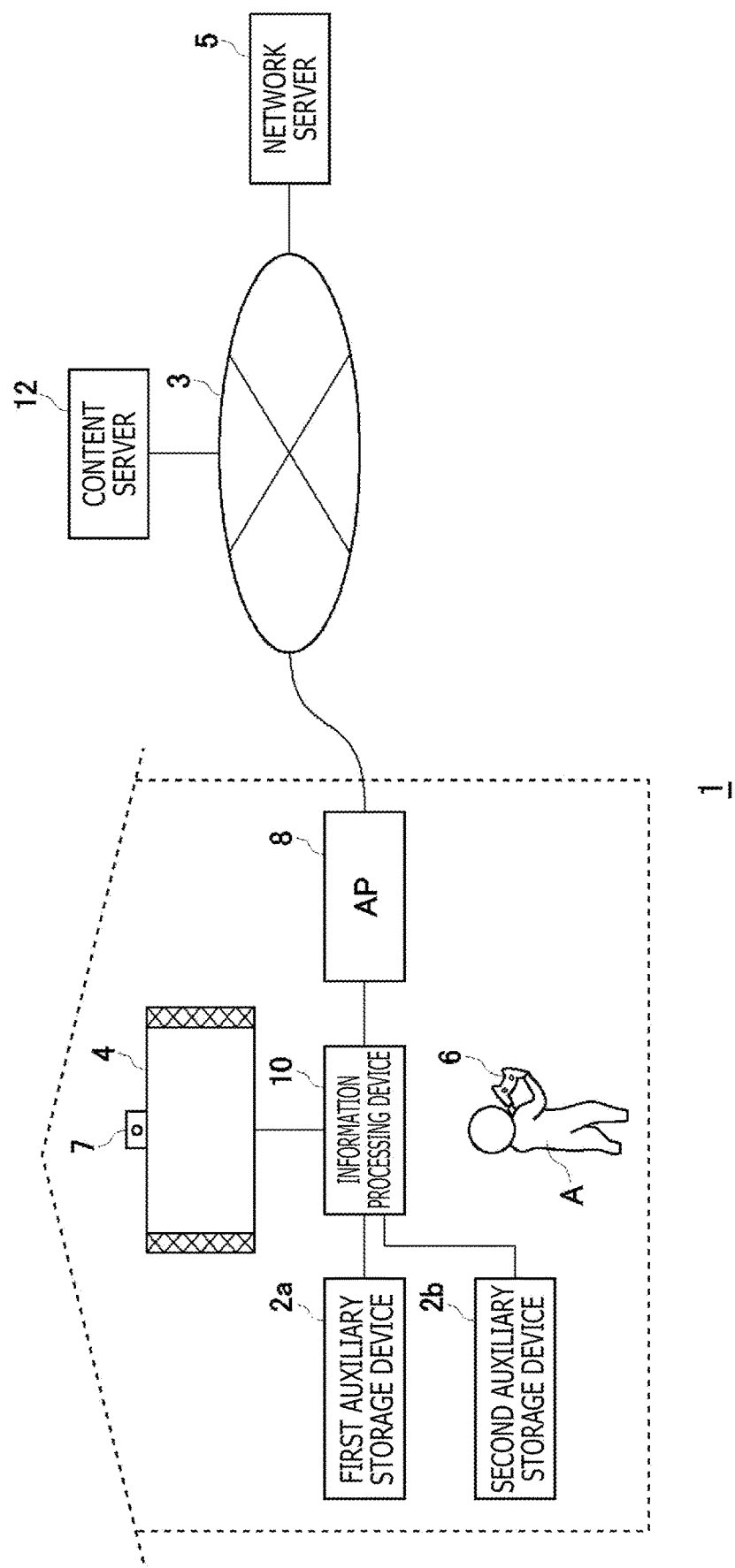
FIG. 1 is a view depicting an information processing system according to an embodiment.

FIG. 1 depicts an information processing system 1 according to an embodiment of the present invention. The information processing system 1 includes an information processing device 10, a network server 5, and a content server 12 that distributes digital content, and they are connected to each other by a network 3 such as the Internet or a LAN (Local Area Network). The content server 12 retains digital content such as game software and distributes it to the information processing device 10.

An access point (hereinafter referred to as an "AP") 8 has functions of a wireless access point and a router, and the information processing device 10 establishes connection to the AP 8 by wireless or wired connection so as to be connected for communication with the network server 5 and the content server 12 on the network 3.

The information processing device 10 establishes connection to an inputting device 6, which is operated by a user, by wireless or wired connection, and the inputting device 6 outputs information of operation made by the user to the information processing device 10. When the information processing device 10 accepts operation information from the inputting device 6, then it reflects the operation information on processing of an OS (system software) or game software and causes an outputting device 4 to output a result of the processing. In the information processing system 1, the information processing device 10 may be a terminal device such as a game device that executes game software or a personal computer, and the inputting device 6 may be a device such as a game controller that supplies information of operation made by the user to the information processing device 10. The user can operate the OS and the game software by logging in to the OS of the information processing device 10.

The network server 5 is maintained and managed by an operating entity of the information processing system 1 and provides a network service to users of the information processing system 1. The network server 5 manages network accounts for identifying each of the users, and each user uses its network account to sign in to the network service provided by the network server 5. By signing in to the network service from the information processing device 10, the user can receive distribution of digital content from the content server 12 and can record saved data of a game and so forth into the network server 5. It is to be noted that the content server 12 may have a user management function of the network server 5. Although the digital content may be various kinds of application software, in the following description, a case is specifically described in which the digital content is game software.

A first auxiliary storage device 2a and a second auxiliary storage device 2b are large-capacity storage devices such as an HDD (Hard Disk Drive) or an SSD (Solid State Drive). The first auxiliary storage device 2a may be a built-in storage device incorporated in a housing of the information processing device 10, and the second auxiliary storage device 2b may be an external storage device connected to the information processing device 10 by a cable or the like. The first auxiliary storage device 2a allows writing/reading of data at a speed higher than that of the second auxiliary storage device 2b, and the information processing device 10 guarantees operation of application software recorded in the first auxiliary storage device 2a. Where the two auxiliary storage devices are not specifically distinguished from each other, the first auxiliary storage device 2a and/or the second auxiliary storage device 2b is sometimes referred to collectively as an "auxiliary storage device 2."

The outputting device 4 may be a television set that includes a display that outputs an image and a speaker that outputs sound or may be a head-mounted display. The outputting device 4 may be connected to the information processing device 10 by a wire cable or by wireless connection.

The inputting device 6 includes a plurality of inputting sections such as a plurality of push-type operation buttons, an analog stick that can input an analog amount, and a rotary-type button. A camera 7 that is an imaging device is provided in the proximity of the outputting device 4 and captures an image of a space around the outputting device 4. Although FIG. 1 depicts an example in which the camera 7 is attached to an upper portion of the outputting device 4, the camera 7 may otherwise be arranged at a side portion of the outputting device 4. In any case, the camera 7 is arranged at a position at which it can capture an image of the user who plays a game in front of the outputting device 4. The camera 7 may be a stereo camera. The information processing device 10 has a function of performing face authentication of the user based on an image captured by the camera 7 to allow the user to log in to the information processing device 10.

Figure 2:
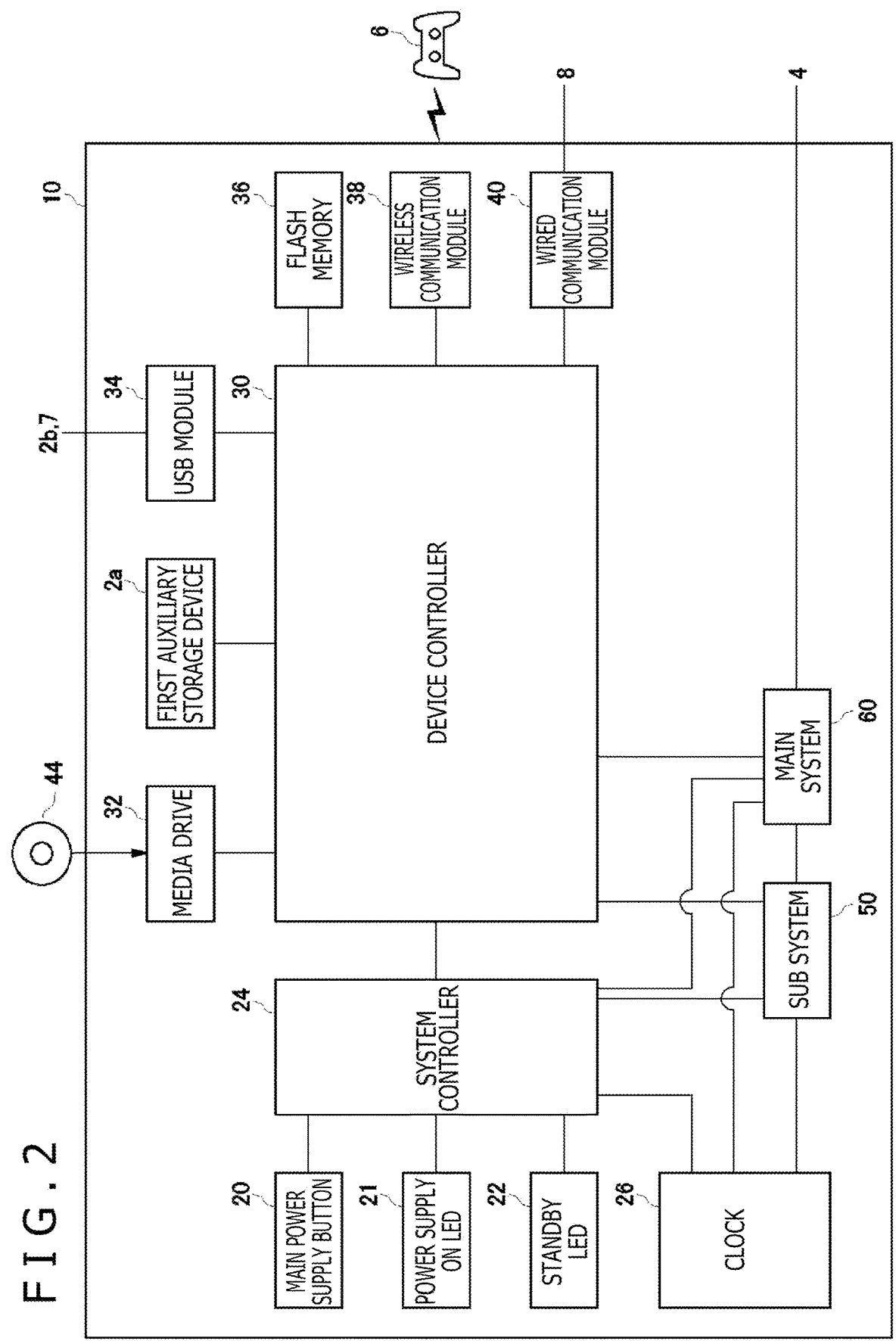
FIG. 2 is a view depicting a hardware configuration of an information processing device.

FIG. 2 depicts a hardware configuration of the information processing device 10. The information processing device 10 includes a main power supply button 20, a power supply ON LED (Light Emitting Diode) 21, a standby LED 22, a system controller 24, a clock 26, a device controller 30, a media drive 32, a USB (Universal Serial Bus) module 34, a flash memory 36, a wireless communication module 38, a wired communication module 40, a sub system 50, and a main system 60.

The main system 60 includes a main CPU (Central Processing Unit), a memory that is a main storage device, a memory controller, a GPU (Graphics Processing Unit), and so forth. The GPU is used principally for arithmetic operation processing of a game program. These functions may be configured as a system on-chip and formed on a single chip. The main CPU has a function of executing game software recorded in the first auxiliary storage device 2a, the second auxiliary storage device 2b, or a ROM medium 44.

The sub system 50 includes a sub CPU, a memory that is a main storage device, a memory controller, and so forth but does not include a GPU, nor does it have a function of executing a game program. The number of circuit gates of the sub CPU is smaller than the number of circuit gates of the main CPU, and operation power consumption of the sub CPU is lower than operation power consumption of the main CPU.

The main power supply button 20 is a button to which operation inputting is performed by the user, and is provided on a front face of the housing of the information processing device 10 to be operated for switching on or off the power supply to the main system 60 of the information processing device 10. The power supply ON LED 21 is turned on when the main power supply button 20 is switched on, and the standby LED 22 is turned on when the main power supply button 20 is switched off.

The system controller 24 detects depression of the main power supply button 20 by the user. If the main power supply button 20 is depressed when the main power supply is in an off state, then the system controller 24 acquires the depression operation as an "on instruction."If the main power supply button 20 is depressed when the main power supply is in an on state, on the other hand, the system controller 24 acquires the depression operation as an "off instruction."

The clock 26 is a real-time clock and generates current date and time information to supply it to the system controller 24, the sub system 50, and the main system 60.

The device controller 30 is configured as an LSI (Large-Scale Integrated Circuit) that executes transfer of information between devices like a south bridge. As depicted in FIG. 2, to the device controller 30, such devices as the system controller 24, the media drive 32, the first auxiliary storage device 2a, the USB module 34, the flash memory 36, the wireless communication module 38, the wired communication module 40, the sub system 50, and the main system 60 are connected. The device controller 30 absorbs a difference in electric characteristic and a difference in data transfer speed between the devices to control the timing of data transfer.

The media drive 32 is a drive device that accepts and drives the ROM medium 44 in which application software of a game and so forth is recorded to read out a program, data, and so forth from the ROM medium 44. Although, in the following description, where programs and data are not specifically distinguished from each other, they are sometimes collectively referred to as data, the term "data" is used also as a term representing an element that configures a file. The ROM medium 44 is a read-only recording medium such as an optical disk, a magneto-optical disk, or a Blu-ray disk.

In the embodiment, the game software recorded in the ROM medium 44 is all copied and installed into the first auxiliary storage device 2a or the second auxiliary storage device 2b. The main system 60 executes the game software installed in the first auxiliary storage device 2a or the second auxiliary storage device 2b.

The USB module 34 is a module that connects to external equipment by a USB cable. The USB module 34 may connect to the second auxiliary storage device 2b and the camera 7 by a USB cable. The flash memory 36 is an auxiliary storage device that configures an internal storage. The wireless communication module 38 communicates, for example, with the inputting device 6 by wireless communication using a communication protocol such as the Bluetooth (registered trademark) protocol or the IEEE (Institute of Electrical and Electronics Engineers) 802.11 protocol. It is to be noted that the wireless communication module 38 may support a digital mobile phone system. The wired communication module 40 communicates with external equipment by wired communication and connects to the network 3 through the AP 8.

Referring back to FIG. 1, the content server 12 distributes game software to the information processing device 10. The game software includes a plurality of files for executing a game such as a start-up file and a game program and a plurality of files that are used by the OS of the information processing device 10, and the content server 12 provides the information processing device 10 with an image file of the game software recorded originally on the ROM medium 44. The game program is a program necessary for execution of the game, and the game progresses by running of the game program. The start-up file is a program for starting up the game program, and when the start-up file is executed, then the game program is called and executed. The files used by the OS include, for example, game icon images and so forth to be displayed on a menu screen image of the information processing device 10.

The game software has a tree-type directory structure, and the start-up file is included in a root directory of the highest layer. Subdirectories of lower layers are classified for each file type, and for example, a subdirectory for 3D (Three-Dimensional) models, a subdirectory for textures, a subdirectory for scripts, and so forth are formed. Each subdirectory includes corresponding files, and a plurality of 3D model files are included in the subdirectory for 3D models, a plurality of texture files are included in the subdirectory for textures, and a plurality of script files are included in the subdirectory for scripts. For example, the subdirectory for textures includes a texture file for a scene 1, a texture file for a scene 2, a texture file for a scene 3, and so forth of the game.

Figure 3:
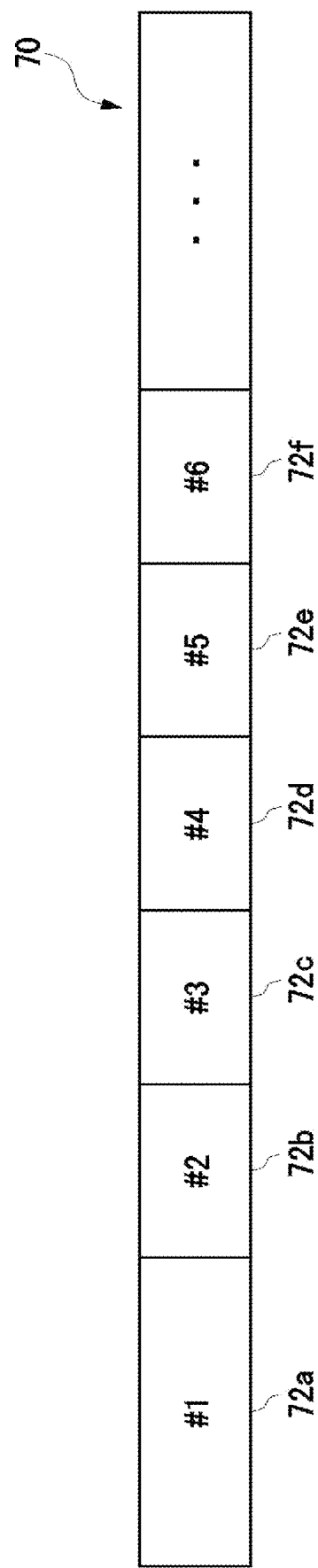
FIG. 3 is a conceptual diagram of a file configuration of game software.

FIG. 3 depicts a conceptual view of a file configuration of game software. Game software 70 in the embodiment includes a plurality of files and is logically divided into a plurality of groups 72 as depicted in FIG. 3. Each file belongs to at least one of the plurality of groups 72, and at least one file belongs to each group 72. In the game software 70 depicted in FIG. 3, a first group 72a exists as a top group, and as succeeding groups, a second group 72b, a third group 72c, a fourth group 72d, a fifth group 72e, and a sixth group 72f exist. It is to be noted that seventh and succeeding groups 72 may follow the sixth group 72f. Each group is identified by a group number such as "first" or "second."

To each of the logically divided groups, files included in a plurality of subdirectories belong. In other words, each group includes files of different types and is set such that files necessary when the information processing device 10 executes a specific unit such as a scene or a stage in the game belong thereto.

To the first group 72a, a program file and a data file necessary to start up the game software 70 belong. Accordingly, where the information processing device 10 is to acquire the game software 70 from the content server 12, if all files belonging to the first group 72a are downloaded, then even if files of the second group 72b and the succeeding groups are not downloaded, the information processing device 10 can start up the game software 70 immediately. It is to be noted that, after the information processing device 10 acquires all the files belonging to the first group 72a and starts up the game software 70, it downloads files belonging to the succeeding groups 72 on the background. In this manner, by downloading minimal files necessary for execution of the game first and enabling execution of the game on completion of download of these files, it is possible to reduce download waiting time for the user. It is to be noted that, in the embodiment, both the game software 70 recorded on the ROM medium 44 and the game software 70 downloaded from the content server 12 or the like have a data structure having the same files and the same directory configuration.

Figure 4:
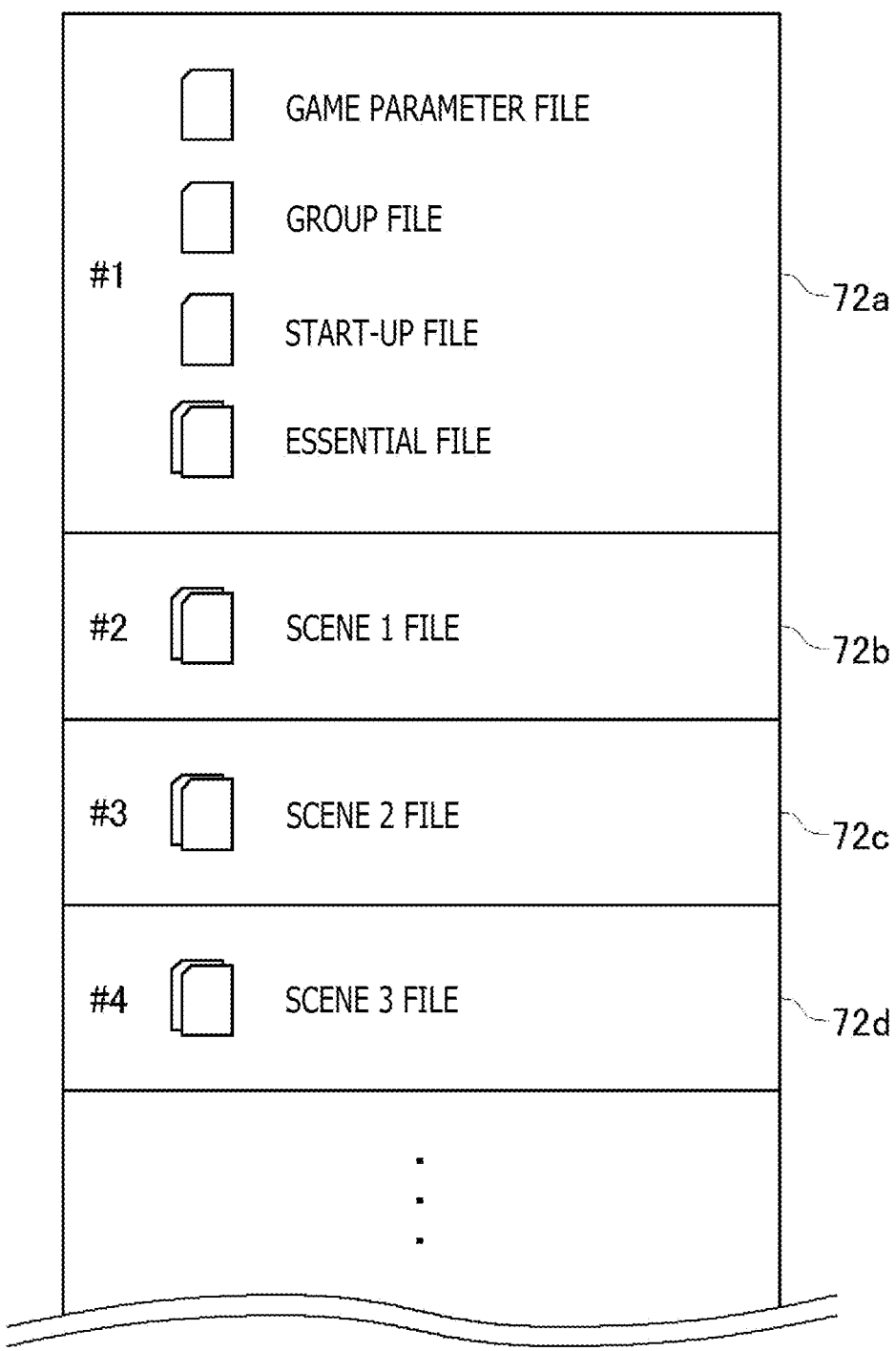
FIG. 4 is a view depicting an example of a particular file configuration of game software.

FIG. 4 depicts an example of a particular file configuration of game software. The first group 72a includes a plurality of files to be downloaded first in the game software 70, and here, a game parameter file, a group file, a start-up file, and essential files are indicated.

The game parameter file is a file used by the OS of the information processing device 10 and includes, for example, such information as title ID (Identification) and a display resolution, icon image data, and so forth.

The group file is a definition file that describes in which group each file is included. While the group file may be represented by the XML (Extensible Markup Language), it may otherwise be represented by another program language and may be represented in any format. The group file describes a plurality of groups whose installation is necessary when play modes provided in the game are to be executed.

The start-up file is a program for starting up the game program. The essential files include a file of a program required for executing the game, a common file used in the entire game, and so forth.

When the information processing device 10 downloads the game software 70 from the content server 12, it can start up the game if it acquires and installs all of the files belonging to the first group 72a. Conversely speaking, the first group 72a includes a plurality of files necessary for the user to play part of the game. Here, the game play here may include setting operations of the user to be performed at the time of starting of the game, such as to decide a character or decide a game level. In other words, the first group 72a includes a plurality of files necessary to start up the game and establish a state in which the user can perform at least some operation. The game play that can be executed by using the files included in the first group 72a may be, for example, only initial settings for the game or may be such settings that enable playing of the game up to its first stage. This depends upon the game manufacturer.

In the example depicted in FIG. 4, a plurality of files for the scene 1 belong to the second group 72b, a plurality of files for the scene 2 belong to the third group 72c, and a plurality of files for the scene 3 belong to the fourth group 72d. In particular, the plurality of files in each group include a program, a 3D model file for a specific scene, a texture file, a script file, and so forth and include files included in a plurality of subdirectories of the directory structure.

Figure 5:
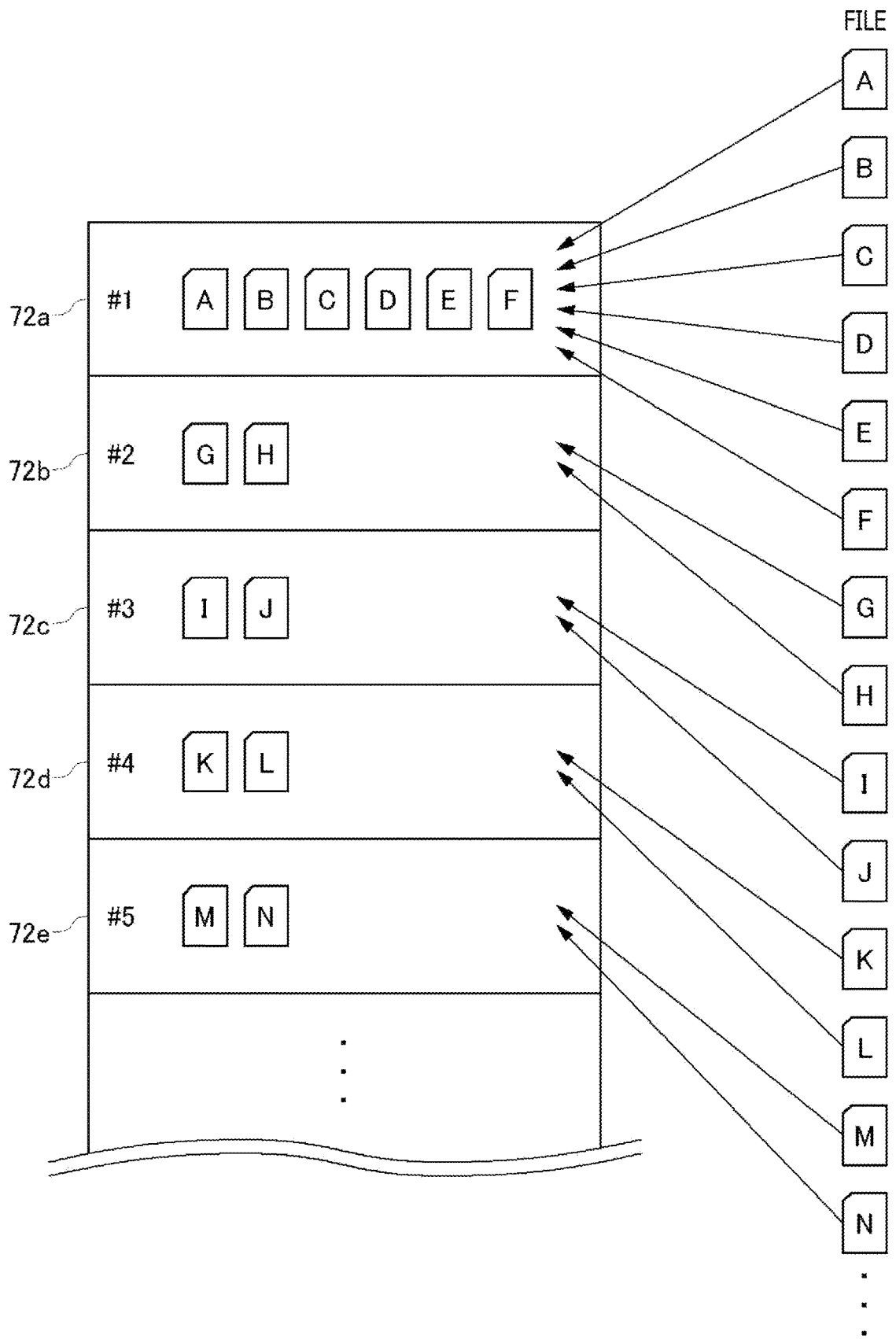
FIG. 5 is a view depicting an example of a relation between groups and files.

FIG. 5 depicts an example of a relation between groups and files. Here, it is depicted that files A to N belong to the groups 72. As depicted in FIG. 5, each file belongs to one of the plurality of groups 72, and at least one file belongs to each group 72.

Figure 6:
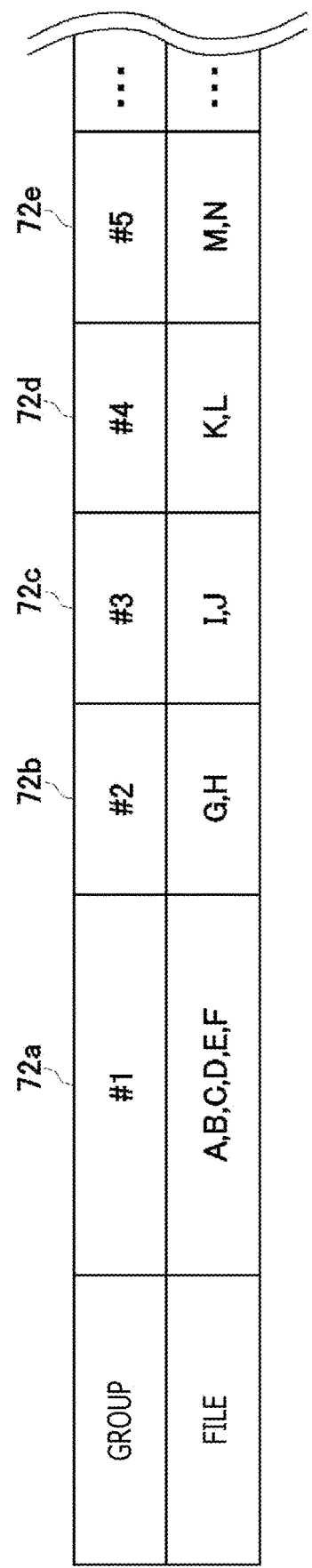
FIG. 6 is a view depicting an example of a group file.

FIG. 6 depicts an example of a group file. As described hereinabove, a group file may be represented by the XML or may be represented by another program language. In FIG. 6, a group file is depicted in which a corresponding relation between groups and files is represented in the form of a table in order to facilitate understanding. When the information processing device 10 downloads each file of the game software 70, it can refer to the group file to determine whether or not download of all files belonging to a certain group is completed. For example, in regard to the first group 72a, by referring to the group file, the information processing device 10 can recognize that files belonging to the first group 72a are the files A, B, C, D, E, and F, and therefore, if these files are recorded in the auxiliary storage device 2, then the information processing device 10 determines that download of all the files belonging to the first group 72a is completed. It is to be noted that the group file may be any one of the files A to F. Since the game software 70 includes a plurality of groups in this manner, the information processing device 10 downloads the files in a unit of a group.

For example, in a case where files X, Y, and Z belong to a group S, if a download request for the group S is generated, then the files X, Y, and Z are downloaded from the content server 12. While, in the embodiment, the information processing device 10 downloads the game software 70 from the content server 12 and installs the game software 70 into the auxiliary storage device 2, it may otherwise acquire the game software 70 from the ROM medium 44 and install the game software 70 into the auxiliary storage device 2.

In the game software 70, a plurality of play modes are provided in order to offer various ways to enjoy the game. Various play modes exist depending upon the game type and, for example, for battle type games, an SP (Single Play) mode in which the game is played by one player, a PvP (Player versus Player) mode in which players compete with each other, a PvE (Player versus Enemy) mode in which a plurality of players cooperate with each other to fight against an NPC (Non-Player Character), and so forth are provided.

The game software 70 of the embodiment is configured such that a plurality of groups for executing each play mode are defined. In terms of the play modes, a plurality of groups for executing the SP mode, a plurality of groups for executing the PvP mode, and a plurality of groups for executing the PvE mode are defined. The plurality of groups of each play mode are defined in the group file.

Before download of the game software 70 is started, the user selects a play mode in which the user wants to play first from the plurality of play modes. The information processing device 10 downloads the groups for executing the play mode selected by the user preferentially to, that is, earlier than, the groups of the other play modes and installs them into the auxiliary storage device 2.

In the embodiment, the first auxiliary storage device 2a is a built-in storage device and allows writing/reading of data at a speed higher than that of the second auxiliary storage device 2b. Especially, in a case where game software requires high-speed data reading, although the information processing device 10 guarantees operation of game software recorded in the first auxiliary storage device 2a, it cannot guarantee operation of game software recorded in the second auxiliary storage device 2b that is an extended storage. Therefore, preferably, the information processing device 10 installs the game software 70 into the first auxiliary storage device 2a and reads out necessary files from the first auxiliary storage device 2a to execute the game.

Figure 7:
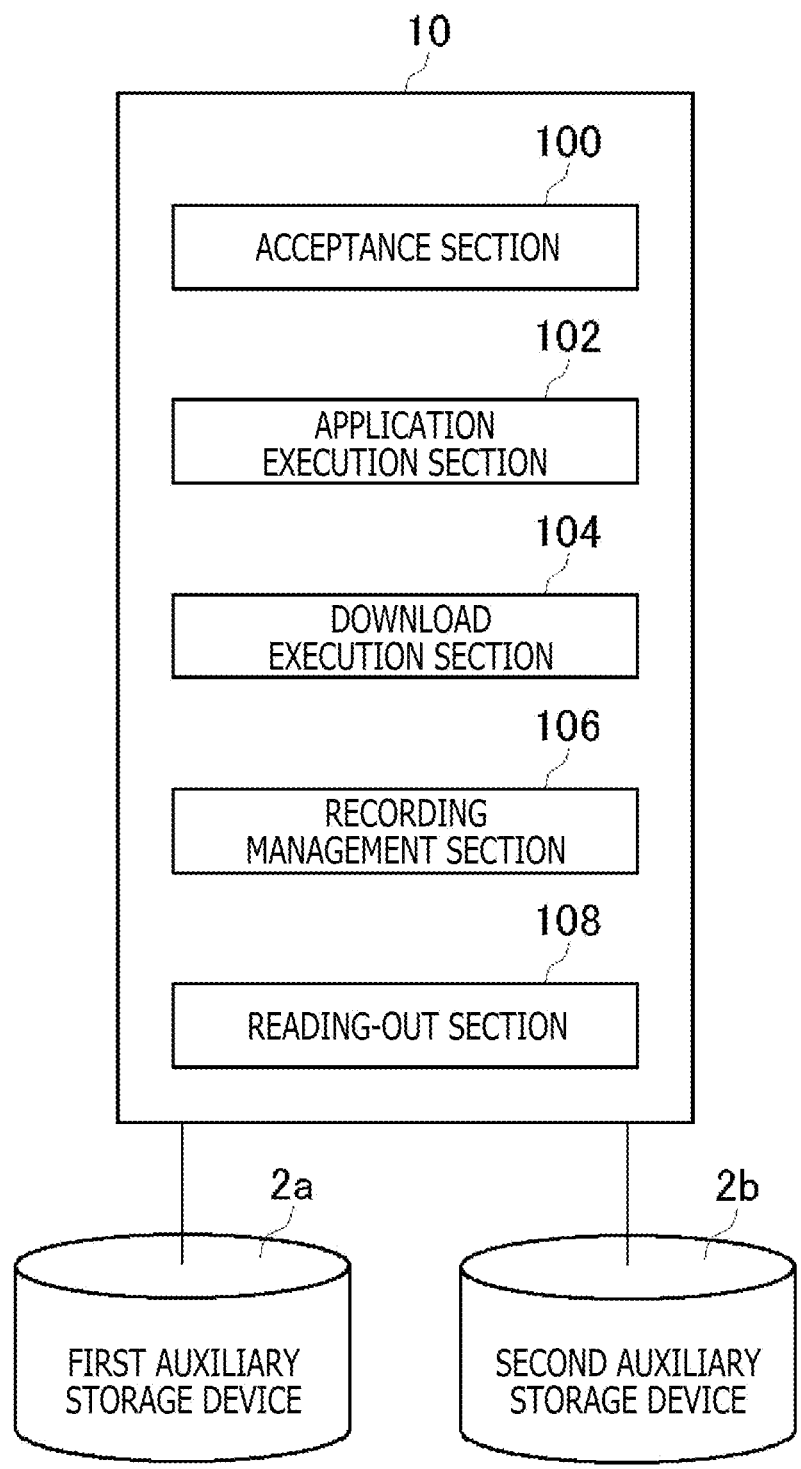
FIG. 7 is a view depicting functional blocks of the information processing device.

FIG. 7 depicts functional blocks of the information processing device 10. The information processing device 10 includes an acceptance section 100, an application execution section 102, a download execution section 104, a recording management section 106, and a reading-out section 108. The first auxiliary storage device 2a and the second auxiliary storage device 2b are used as storage devices for storing a plurality of files that make up the game software 70. The reading-out section 108 is capable of reading out files recorded in the first auxiliary storage device 2a and the second auxiliary storage device 2b.

While the components mentioned are implemented, in terms of hardware components, by a CPU of any computer, a memory, a program loaded in the memory, a storage, and so forth, FIG. 7 depicts functional blocks implemented by cooperation of them. Accordingly, it is recognized by those skilled in the art that the functional blocks can be implemented in various forms only by hardware, only by software, or by a combination of hardware and software.

<Download of Game Software>

When the user is to purchase game software, the acceptance section 100 receives an address of a sales website of the game software and causes the sales website to be displayed on the outputting device 4. If the user operates the inputting device 6 to select a piece of software to be purchased, then an accounting process is performed and license information is granted to the information processing device 10. The download execution section 104 then transmits a download request including specification information (title ID) of the game to be downloaded to the content server 12.

The content server 12 receives the download request and transmits response information for permitting the download and screen image data for allowing the user to select a play mode of the game. The acceptance section 100 receives the screen image data, and the download execution section 104 displays a screen image for selecting a play mode relating to the download of the game software 70 on the outputting device 4. If the user operates the inputting device 6 to select a play mode in which the user wants to play first, then the download execution section 104 first downloads a plurality of files belonging to the first group 72a and then downloads a plurality of files for executing the selected play mode.

Figure 8:
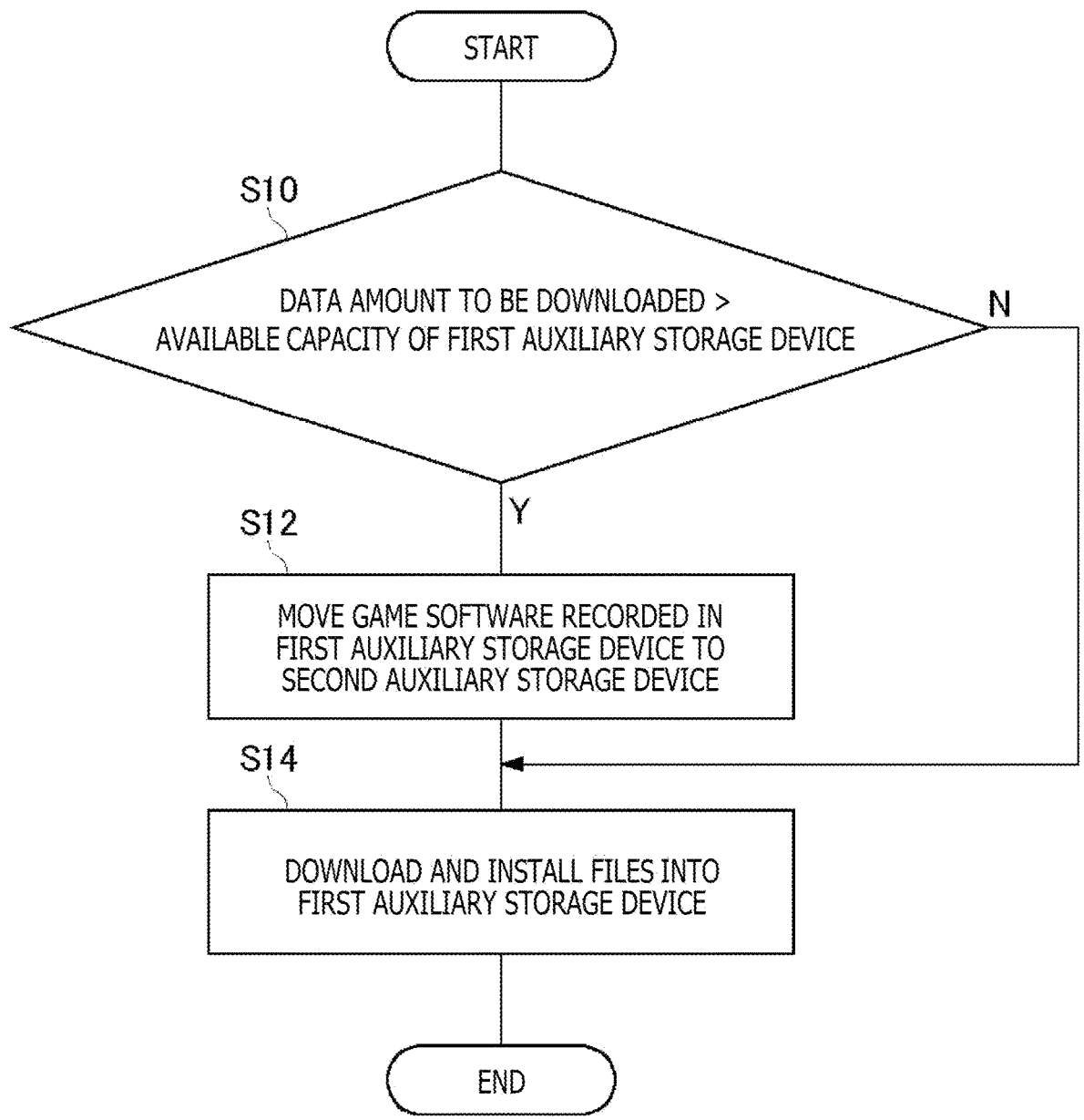
FIG. 8 is a flow chart depicting processing executed by a recording management section upon downloading.

FIG. 8 is a flow chart depicting processing executed by the recording management section 106 upon downloading.

Prior to download of files, the download execution section 104 issues an enquiry regarding a data amount to be downloaded to the content server 12 and notifies the recording management section 106 of the data amount replied from the content server 12. The recording management section 106 compares the data amount to be downloaded and an available capacity of the first auxiliary storage device 2a with each other to confirm whether the first auxiliary storage device 2a has a sufficient available capacity (S10). In a case where the available capacity of the first auxiliary storage device 2a is equal to or greater than the data amount to be downloaded (N at S10), the recording management section 106 permits the download by the download execution section 104. In response to a notification of this permission, the download execution section 104 starts download processing, and the recording management section 106 installs the downloaded files into the first auxiliary storage device 2a (S14).

On the other hand, in a case where the available capacity of the first auxiliary storage device 2a is smaller than the data amount to be downloaded (Y at S10), that is, in a case where the available capacity of the first auxiliary storage device 2a is not sufficient, the recording management section 106 moves files of another game software recorded in the first auxiliary storage device 2a to the second auxiliary storage device 2b (S12). It is to be noted that to move files from the first auxiliary storage device 2a to the second auxiliary storage device 2b signifies to record the files into the second auxiliary storage device 2b and delete the files from the first auxiliary storage device 2a. In a case where a plurality of pieces of game software are installed in the first auxiliary storage device 2a, the piece of software whose last play date and time is oldest may be selected as a target of the movement.

It is to be noted that, as hereinafter described, there are two types of games including one type that can be started up only in a state in which it is recorded in the first auxiliary storage device 2a and the other type that can be started up even in a state in which it is recorded in the second auxiliary storage device 2b. Therefore, the recording management section 106 may select, as the target of the movement, game software of a game whose last play date and time is oldest from games that can be started up even in a state in which they are recorded in the second auxiliary storage device 2b. It is to be noted that it is necessary for the recording management section 106 to select game software to be moved such that the available capacity of the first auxiliary storage device 2a that increases as a result of the movement of the game software to the second auxiliary storage device 2b is equal to or greater than the data amount to be downloaded. To this end, the recording management section 106 may select a plurality of pieces of game software as the target of the movement, according to the available capacity of the first auxiliary storage device 2a.

After a sufficient available capacity of the first auxiliary storage device 2a is secured, the recording management section 106 permits download by the download execution section 104. In response to a notification of this permission, the download execution section 104 starts download processing, and the recording management section 106 installs downloaded files into the first auxiliary storage device 2a (S14). After the downloaded game software is installed into the first auxiliary storage device 2a, when the user starts playing the game, the reading-out section 108 can read out the installed files from the first auxiliary storage device 2a and can provide the files to the application execution section 102. After the files included in the first group 72a are downloaded, the download execution section 104 preferentially downloads files included in a group corresponding to the play mode selected by the user.

<Execution of Game Software>

As described above, when the download execution section 104 downloads game software, if the available capacity of the first auxiliary storage device 2a is not sufficient, then another piece of game software recorded in the first auxiliary storage device 2a is moved to the second auxiliary storage device 2b. By such processing, each piece of game software is recorded in either the first auxiliary storage device 2a or the second auxiliary storage device 2b.

Figure 9:
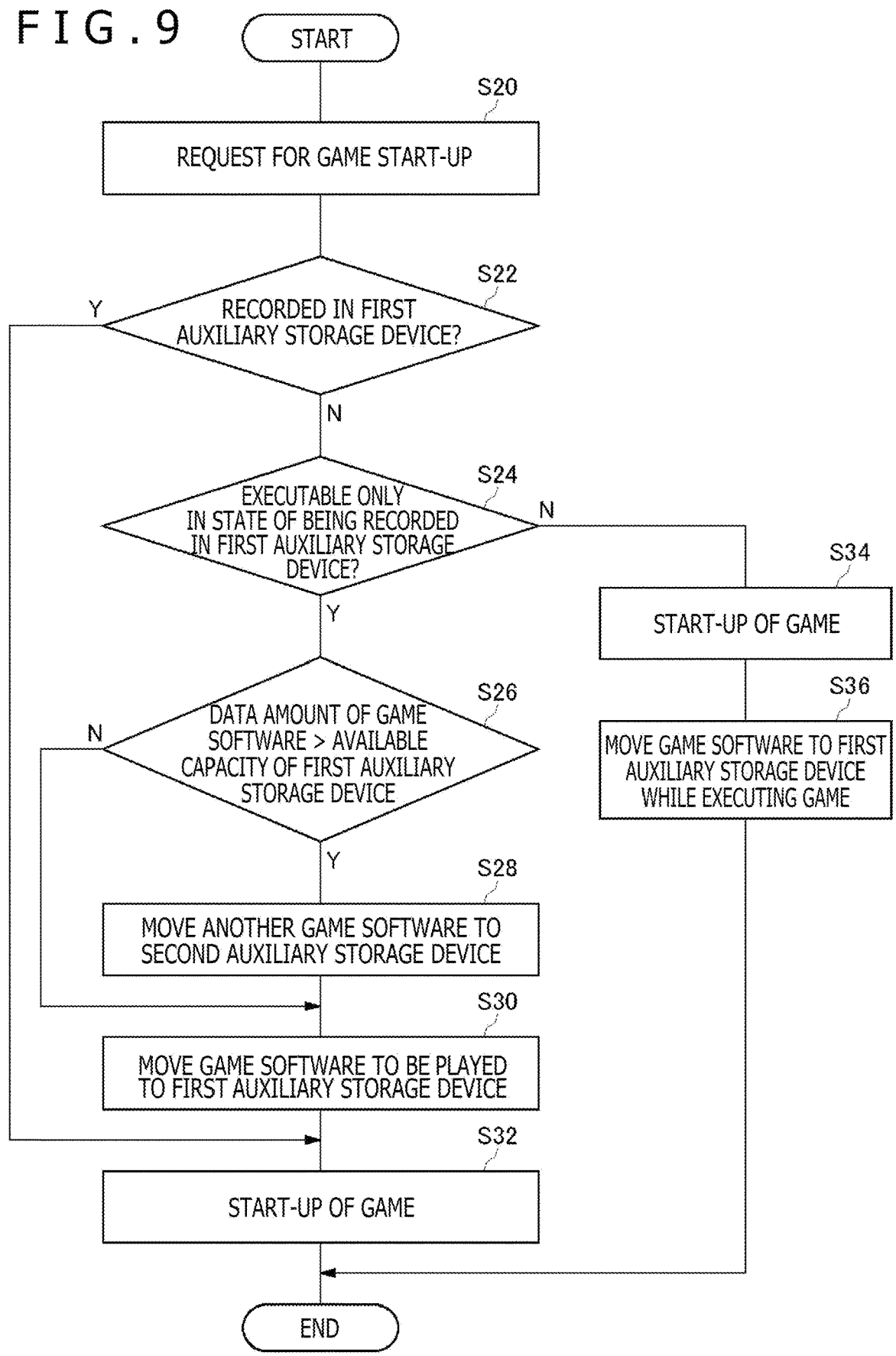
FIG. 9 is a flow chart depicting processing executed by the recording management section when a start-up request for a game is inputted.

FIG. 9 is a flow chart depicting processing executed by the recording management section 106 when the user inputs a start-up request for a game.

If the user selects a game icon of a game to be played on a game selection screen image in which game icons are lined up, then the acceptance section 100 accepts a start-up request for the game (S20). At this time, the recording management section 106 checks whether or not the game software of the target of the start-up request is recorded in the first auxiliary storage device 2a (S22). If the game software is recorded in the first auxiliary storage device 2a (Y at S22), then the reading-out section 108 reads out files necessary for start-up from the first auxiliary storage device 2a, and the application execution section 102 starts up the game software (S32).

In a case where the game software is not recorded in the first auxiliary storage device 2a (N at S22), in other words, in a case where the game software is recorded in the second auxiliary storage device 2b, the recording management section 106 checks whether or not the game software is a game that is executable only in a state in which it is recorded in the first auxiliary storage device 2a (S24). Whether or not the game software is executable only in a state in which it is recorded in the first auxiliary storage device 2a is described in a setting file of the game. For example, in a case where the game software requires high speed reading from the first auxiliary storage device 2a, it is described in the setting file that the game software is executable only in a state in which it is recorded in the first auxiliary storage device 2a.

In the case where it is described in the setting file that the game software is executable only in a state in which it is recorded in the first auxiliary storage device 2a (Y at S24), the recording management section 106 compares the data amount of the game software to be played and the available capacity of the first auxiliary storage device 2a with each other to check whether or not the first auxiliary storage device 2a has a sufficient available capacity (S26). In a case where the available capacity of the first auxiliary storage device 2a is equal to or greater than the data amount of the game software (N at S26), the recording management section 106 moves and installs the files of the game software recorded in the second auxiliary storage device 2b to and into the first auxiliary storage device 2a (S30). It is to be noted that to move files from the second auxiliary storage device 2b to the first auxiliary storage device 2a signifies to record the files into the first auxiliary storage device 2a and delete the files from the second auxiliary storage device 2b. After the files belonging to the first group 72a are installed into the first auxiliary storage device 2a, the reading-out section 108 reads out files necessary for start-up from the first auxiliary storage device 2a, and the application execution section 102 starts up the game software (S32). Since the recording management section 106 manages file movement in this manner, the application execution section 102 can execute the application by using the files moved to the first auxiliary storage device 2a.

On the other hand, in a case where the available capacity of the first auxiliary storage device 2a is smaller than the data amount of the game software to be played (Y at S26), in other words, in a case where the available capacity of the first auxiliary storage device 2a is not sufficient, the recording management section 106 moves files of another piece of game software recorded in the first auxiliary storage device 2a from the first auxiliary storage device 2a to the second auxiliary storage device 2b (S28). In a case where a plurality of pieces of game software are installed in the first auxiliary storage device 2a, the piece of game software whose last play date and time is oldest may be selected as a target of the movement.

The recording management section 106 selects game software to be moved to the second auxiliary storage device 2b such that the available capacity of the first auxiliary storage device 2a increased as a result of the movement of the game software to the second auxiliary storage device 2b is equal to or greater than the data amount of the game software to be played. To this end, the recording management section 106 may select a plurality of pieces of game software as the target of the movement. After the recording management section 106 moves other piece or pieces of game software to the second auxiliary storage device 2b, it moves and installs the game software to be played from the second auxiliary storage device 2b to and into the first auxiliary storage device 2a (S30). After the files belonging to the first group 72a are installed into the first auxiliary storage device 2a, the reading-out section 108 reads out files necessary for start-up from the first auxiliary storage device 2a, and the application execution section 102 starts up the game software (S32). Since the recording management section 106 manages the file movement in this manner, the application execution section 102 can execute the application by using the files moved to the first auxiliary storage device 2a.

In a case where it is described in the setting file at S24 that the game software is executable even in a state other than the state in which it is recorded in the first auxiliary storage device 2a (N at S24), the reading-out section 108 reads out files necessary for start-up from the second auxiliary storage device 2b, and the application execution section 102 starts up the game software (S34). Thereafter, in the background during execution of the game, the recording management section 106 moves the files recorded in the second auxiliary storage device 2b to the first auxiliary storage device 2a (S36). During execution of the game by the application execution section 102, the reading-out section 108 reads out the files having been moved to the first auxiliary storage device 2a from the first auxiliary storage device 2a and reads out files remaining in the second auxiliary storage device 2b from the second auxiliary storage device 2b. In the information processing device 10, recording statuses of the first auxiliary storage device 2a and the second auxiliary storage device 2b are managed by a file system, and the reading-out section 108 refers to the file system to determine in which one of the first auxiliary storage device 2a and the second auxiliary storage device 2b each file is recorded. During execution of the game, all files are moved to and recorded into the first auxiliary storage device 2a in the end.

The present invention has been described on the basis of the embodiment. This embodiment is exemplary, and it is recognized by those skilled in the art that various modifications are possible in regard to the combinations of the components, processes, and so forth of the embodiment and that also such modifications fall within the scope of the present invention. While the embodiment has been described taking a game as an example of application, any other type of application may be adopted.

While the embodiment has been described in regard to an example in which the game software 70 is downloaded to be installed into the auxiliary storage device 2, the game software 70 may otherwise be provided from the ROM medium 44. Also, in this case, efficient installation processing is implemented by the recording management section 106 installing game files in a unit of a group.

INDUSTRIAL APPLICABILITY

The present invention can be utilized in a field in which an application is executed.

REFERENCE SIGNS LIST

1: Information processing system
2a: First auxiliary storage device
2b: Second auxiliary storage device
10: Information processing device
100: Acceptance section
102: Application execution section
104: Download execution section
106: Recording management section
108: Reading-out section

The invention claimed is:
1. An information processing device that is capable of reading out files recorded in a first auxiliary storage device and a second auxiliary storage device, comprising:
  processing circuitry configured to
  receive a request to start an application, wherein the application is stored in the second auxiliary storage device,
  determine whether or not the first auxiliary storage device has an available capacity smaller than a capacity required for the application to be stored in the first auxiliary storage device,
  in a case where the first auxiliary storage device has an available capacity smaller than the capacity required for the application to be stored in the first auxiliary storage device, move another application having an oldest last play date and time from the first auxiliary storage device to the second auxiliary storage device,
  in a case where the first auxiliary storage device has an available capacity greater than or equal to the capacity required for the application to be stored in the first auxiliary storage device after moving the another application, move files of the application recorded in the second auxiliary storage device to the first auxiliary storage device, wherein the first auxiliary storage device is a built-in storage device incorporated into a housing of the information processing device and the second auxiliary storage device is an external storage device physically connected to the information processing device,
  before moving files of the application,
    present a plurality of play modes to a user and receive a user selection of a preferred play mode from the plurality of play modes,
    identify a group of files corresponding to the user-selected preferred play mode, and
    prioritize the movement of the identified group of files corresponding to the user-selected preferred play mode from the second auxiliary storage device to the first auxiliary storage device, such that the identified group of files is moved earlier than other groups of files not corresponding to the user-selected preferred play mode, and
  after a first group of the files corresponding to files of the application necessary to start the application are moved, execute the application by reading out one or more files moved to the first auxiliary storage device and reading out one or more files remaining in the second auxiliary storage device, wherein all files of the application are moved to and recorded in the first auxiliary storage device during execution of the application.

2. The information processing device according to claim 1, wherein the processing circuitry is further configured to
in a case that the file of the another application is less than the capacity required for the application to be stored in the first auxiliary storage device, move a plurality of other applications to from the first auxiliary storage device to the second auxiliary storage device to create sufficient available capacity in the first auxiliary storage device.

3. An application execution method executed by an information processing device that is capable of reading out files recorded in a first auxiliary storage device and a second auxiliary storage device, the application execution method comprising:
receiving a request to start an application, wherein the application is stored in the second auxiliary storage device;
determining whether or not the first auxiliary storage device has an available capacity smaller than a capacity required for the application to be stored in the first auxiliary storage device;
in a case where the first auxiliary storage device has an available capacity smaller than the capacity required for the application to be stored in the first auxiliary storage device, moving another application having an oldest last play date and time from the first auxiliary storage device to the second auxiliary storage device;
in a case where the first auxiliary storage device has an available capacity greater than or equal to the capacity required for the application to be stored in the first auxiliary storage device after moving the another application, moving files of the application recorded in the second auxiliary storage device to the first auxiliary storage device, wherein the first auxiliary storage device is a built-in storage device incorporated into a housing of the information processing device and the second auxiliary storage device is an external storage device physically connected to the information processing device;
before moving files of the application,
presenting a plurality of play modes to a user and receive a user selection of a preferred play mode from the plurality of play modes;
identifying a group of files corresponding to the user-selected preferred play mode; and
prioritizing the movement of the identified group of files corresponding to the user-selected preferred play mode from the second auxiliary storage device to the first auxiliary storage device, such that the identified group of files is moved earlier than other groups of files not corresponding to the user-selected preferred play mode; and
after a first group of the files corresponding to files of the application necessary to start the application are moved, executing the application by reading out one or more files moved to the first auxiliary storage device and reading out one or more files remaining in the second auxiliary storage device, wherein all files of the application are moved to and recorded in the first auxiliary storage device during execution of the application.

4. A non-transitory recording medium storing computer-readable instructions thereon which, when executed by a computer, cause the computer to perform a method, the method comprising:
receiving a request to start an application, wherein the application is stored in the second auxiliary storage device;
determining whether or not the first auxiliary storage device has an available capacity smaller than a capacity required for the application to be stored in the first auxiliary storage device;
in a case where the first auxiliary storage device has an available capacity smaller than the capacity required for the application to be stored in the first auxiliary storage device, moving another application having an oldest last play date and time from the first auxiliary storage device to the second auxiliary storage device;
in a case where the first auxiliary storage device has an available capacity greater than or equal to the capacity required for the application to be stored in the first auxiliary storage device after moving the another application, moving files of the application recorded in the second auxiliary storage device to the first auxiliary storage device, wherein the first auxiliary storage device is a built-in storage device incorporated into a housing of the information processing device and the second auxiliary storage device is an external storage device physically connected to the information processing device;
before moving files of the application,
presenting a plurality of play modes to a user and receive a user selection of a preferred play mode from the plurality of play modes;
identifying a group of files corresponding to the user-selected preferred play mode; and
prioritizing the movement of the identified group of files corresponding to the user-selected preferred play mode from the second auxiliary storage device to the first auxiliary storage device, such that the identified group of files is moved earlier than other groups of files not corresponding to the user-selected preferred play mode; and
after a first group of the files corresponding to files of the application necessary to start the application are moved, executing the application by reading out one or more files moved to the first auxiliary storage device and reading out one or more files remaining in the second auxiliary storage device, wherein all files of the application are moved to and recorded in the first auxiliary storage device during execution of the application.

* * * * *